April 14, 1953  W. F. MARTIN ET AL  2,634,934
MOUNTING FOR TROPHIES, ORNAMENTS AND THE LIKE
Filed Dec. 29, 1948
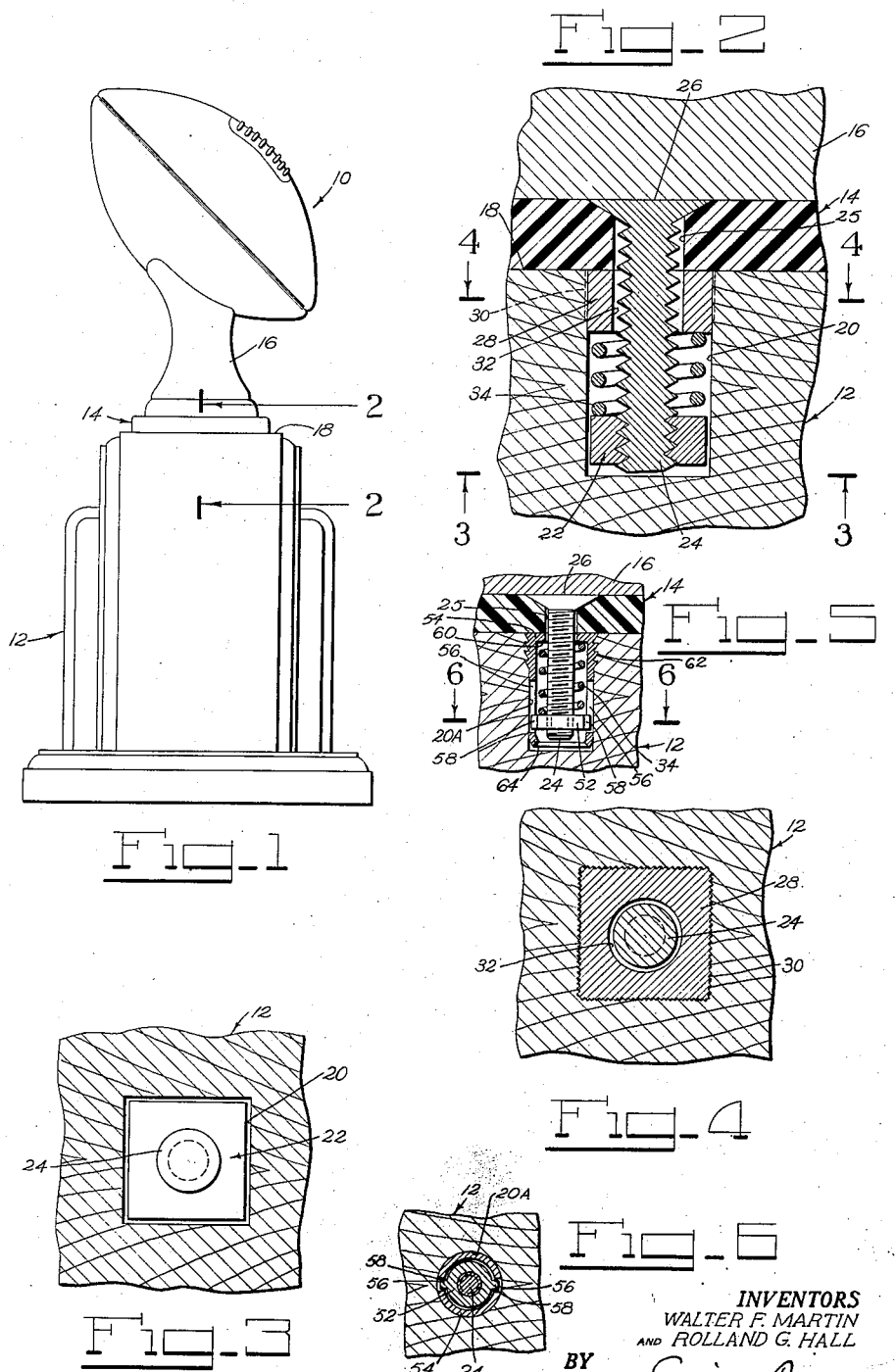
INVENTORS
WALTER F. MARTIN
AND ROLLAND G. HALL
BY
*Edwin Levisohn*
ATTORNEY Patented Apr. 14, 1953

2,634,934

UNITED STATES PATENT OFFICE 2,634,934

MOUNTING FOR TROPHIES, ORNAMENTS, AND THE LIKE

Walter F. Martin, North Haven, and Rolland G. Hall, Yalesville, Conn., assignors to R. Wallace & Sons Manufacturing Company, Wallingford, Conn., a corporation Application December 29, 1948, Serial No. 68,026

4 Claims. (Cl. 248—158)

This invention relates to mountings for trophies, ornaments and the like.

The primary object of the present invention is the provision of means for fastening a trophy or other ornament to a base or pedestal therefor in such manner that the ornament may be correctly positioned on the base while securely fastened thereto.

Another object of the invention is to provide a connection between the ornament and base which possesses a degree of resiliency whereby to decrease the possibility of fracture of the ornament or some part thereof in the event that the ornament mounted on the base is dropped or struck in some other way.

The above objects of the invention and other objects, features and advantages thereof will be fully understood from the following description considered with reference to the accompanying illustrative drawings.

In the drawings:

Fig. 1 is a side view of a trophy and its mounting embodying the present invention;

Fig. 2 is a sectional view, on a larger scale, on the line 2—2 of Fig. 1;

Fig. 3 is a sectional view on the line 3—3 of Fig. 2;

Fig. 4 is a sectional view on the line 4—4 of Fig. 2;

Fig. 5 is a view similar to Fig. 2 showing another form of the invention;

Fig. 6 is a sectional view on the line 6—6 of Fig. 5.

Referring now to the drawings in detail, the ornament 10 which is mounted on the base 12 is illustrated as in the form of a football, but it will be understood that the ornament which is mounted on said base may be of any other form. The base 12 may likewise be of any other suitable configuration. Said base may be made of wood, plastic, metal, or of any other suitable material. As here shown a protective plate 14 which may be made of wood, plastic, metal or of any other suitable material, is interposed between the lower part 16 of the ornament and the upper surface 18 of the base to prevent scratching or marking of said surface of the base which might otherwise occur if the part 16 of the ornament directly engaged said surface of the base. It will be understood that the football or other ornament is normally in fixed relation with respect to part 16.

Pursuant to the presently preferred embodiment of the invention, the base 12 is provided with a vertically extending recess 20 which is non-circular, preferably rectangular in cross section. A nut or internally screw-threaded member 22 is positioned in said recess for screw-threaded engagement with a screw-threaded member or pin 24 which is fixedly secured to and depends from the lower part 16 of ornament 10 as indicated at 26 in Fig. 2. Thus member 22 is movable longitudinally of recess 20 but is non-rotatable therein. It will be understood, however, that any other suitable provision may be made for accomplishing this result. Threaded member or pin 24 may be secured to part 16 in any suitable way, for example by soldering or welding said member to said part, or if desired said threaded member may be integral with part 16 of the ornament. An abutment member 28 is fixedly secured in recess 20 at the upper part thereof. The securement of member 28 in recess 20 may be accomplished in any suitable way. Preferably, as here shown, member 28 is provided with a serrated or toothed peripheral surface indicated at 30 and said member is slightly larger in cross section than recess 20 so that when said member is forced into said recess through the open top thereof the teeth or serrations 30 penetrate the wall of said recess and thus securely fasten member 28 in position. Said member is provided with an integral axial opening 32 of larger diameter than threaded member 24, providing clearance between the two members. A helical spring 34 is interposed between the confronting surfaces of members 22 and 28 as clearly shown in Fig. 2. It will be noted that member 22 is somewhat smaller than recess 20 providing a space between the wall of said recess and the peripheral surface of member 22.

In providing the base 12 with the means for attaching the ornament thereto, the nut or internally threaded member 22 is first placed in recess 20, then the spring 34 is inserted and thereafter the abutment member 28 is placed in position in said recess. The base having these parts positioned in recess 20 is then ready for the attachment thereto of the ornament 10, or of any other ornament provided with a depending screw-threaded member hereinbefore designated as member 24. When it is desired to attach the ornament to the base, said ornament is positioned over said recess and the screw-threaded member 24 thereof is projected through the opening 25 in plate 14, when such plate is provided, and said screw-threaded member 24 is engaged with nut 22 and turned about its axis, thus drawing said nut upwardly toward abutment member 28 against the resilient pressure of spring 34 until the desired tightness between the ornament and the base is obtained. In this connection it will be understood that nut 22 is held against turning movement by the wall of recess 20, said nut and wall being non-circular, so that as member 24 is turned said nut is threaded onto said member and moved longitudinally of recess 20 to the position required to provide the desired degree of resilient pressure between the ornament and its base. Thus it will be readily understood that the ornament can be properly positioned on base 12 without detracting from the proper degree of tightness between the ornament and its base. Also it will be noted that the clearance provided between members 24 and 28 and between member 22 and the wall of recess 20, together with the spring 34 furnishes a shock absorber between the ornament and its base to minimize the possibility of fracture of the ornament in the event that the mounted ornament is dropped or struck. Further in this connection, it will be observed that pin 24 may be tilted with respect to the axis of recess 20, in opposition to spring 34, when a force is applied to the ornament. The small movement thus permitted if the ornament is dropped or struck may be sufficient in certain cases to prevent fracture of the ornament. It is to be noted however that it is within the scope of this invention to omit this clearance feature, if desired, while retaining the same general construction without such clearance.

Referring now to the form of the invention illustrated in Figs. 5 and 6, the internally screw-threaded member 52 which corresponds to member 22 is held against rotation in a manner which differs, specifically, from that described above with reference to Figs. 1 to 3, and it will be noted that member 52 and the recess 20A in the base 12 need not be non-circular in cross-section but may be circular as illustrated. More particularly, as here shown, a tubular metal part or frame member 54 is positioned in recess 20A and is provided with diametrically opposite longitudinal slots 56 which are engaged by ears or projections 58 formed integrally with member 52. Said slots and ears provide interengaging means to prevent relative rotation of members 52 and 54. The upper end of tubular part 54 constitutes an abutment for the spring 34, said abutment being provided by the internally peripherally extending shoulder 60. The outer peripheral edge of the upper portion of tubular part 54 is provided with circumferentially extending teeth 62 which are embedded in the wall of recess 20A when said frame member 54 is forced into said recess. After spring 34 and member 52 are inserted in the tubular part 54 through the lower end thereof, said lower end is peened or bent inwardly as indicated at 64 so as to prevent movement of member 52 out of part 54. Thus it will be understood that the attachment including tubular part 54, and the spring 34 and member 52 may be assembled as a unit and inserted as a unit into the recess 20A in the base. Such units may be manufactured for sale by themselves for subsequent application to ornamental bases. In this connection it will be understood that if ornament bases are not provided initially with recesses adapted to receive these units, such recesses may be readily provided in the bases as required. It will be understood that the parts shown by Figs. 5 and 6 but not specifically described are substantially the same as the corresponding parts shown by Figs. 1 to 4 and are therefore designated by the same reference numerals.

While we have shown and described the presently preferred embodiment of our invention, it will be understood that various changes in the form and arrangement of parts and in the details of construction may be made without departing from the underlying idea or principles of this invention within the scope of the appended claims.

Having thus described our invention, what we claim and desire to secure by Letters Patent, is:

1. A mounting for an ornament which is provided with a screw-threaded pin depending from the lower face thereof, comprising a base having its upper face formed complementary to said lower face and a vertically extending recess open at the top and closed at the bottom, said recess extending to said upper face, an internally screw-threaded member positioned in said recess for screw-threaded engagement with said screw-threaded pin of the ornament when said pin is inserted into said recess through said open-top thereof, means providing for said internally screw-threaded member being movable in said recess longitudinally thereof while held against rotation whereby turning of the ornament above the axis of the pin results in movement of said member longitudinally of said recess, an abutment member secured in said recess between said screw-threaded member and spaced from the latter toward the top of said recess, said abutment member having an opening therethrough for the insertion of the pin of the ornament, and a spring bearing on said abutment member and on said screw-threaded member for resiliently urging the latter toward the bottom of said recess and thereby holding the ornament in position on said base, the opening in said abutment member being larger than the diameter of said pin and the peripheral wall of said recess being spaced from the outer peripheral surface of said screw-threaded member whereby the pin of the ornament may be tilted in relation to the axis of said recess against the force of said spring by a force applied to said ornament, with said lower face confronting said upper face.

2. A mounting for an ornament which is provided with a screw-threaded pin depending therefrom, comprising a base having a vertically extending recess open at the top and closed at the bottom, an internally screw-threaded member positioned in said recess for screw-threaded engagement with said screw-threaded pin of the ornament when said pin is inserted into said recess through said open-top thereof, said internally screw-threaded member being movable in said recess longitudinally thereof while held against rotation whereby turning of the ornament about the axis of its pin results in movement of said member longitudinally of said recess, and spring means anchored in said recess and acting on said member for normally urging the latter toward the bottom of said recess and thereby holding the ornament in position on said base, said recess having a tubular part inserted therein, said tubular part having a longitudinal slot and said internally screw-threaded member being movable in said part longitudinally thereof and having a lateral projection which engages said tubular part in said slot for holding said internally screw-threaded member against said rotation thereof.

3. A mounting for an ornament which is provided with a screw-threaded pin depending therefrom, comprising a base having a vertically extending recess open at the top and closed at the bottom, an internally screw-threaded member positioned in said recess for screw-threaded engagement with said screw-threaded pin of the ornament when said pin is inserted into said recess through said open-top thereof, said internally screw-threaded member being movable in said recess longitudinally thereof while held against rotation whereby turning of the ornament about the axis of its pin results in movement of said member longitudinally of said recess, means in said recess providing an abutment, and a helical spring having its opposite ends bearing on said abutment and on said member, respectively, acting on said member for normally urging it toward the bottom of said recess and thereby holding the ornament in position on said base, said abutment means having a tubular part integral therewith, said tubular part having a longitudinal slot and said internally screw-threaded member being movable in said part longitudinally thereof and having a lateral projection which engages said tubular part in said slot for holding said internally screw-threaded member against said rotation thereof.

4. A mounting for an ornament which is provided with a screw-threaded pin depending from the lower face thereof, comprising a base having its upper face formed complementary to said lower face and a vertically extending recess open at the top and closed at the bottom, said recess extending to said upper face, an internally screw-threaded member positioned in said recess for screw-threaded engagement with said screw-threaded pin of the ornament when said pin is inserted into said recess through said open-top thereof, means providing for said internally screw-threaded member being movable in said recess longitudinally thereof while held against rotation whereby tuning of the ornament above the axis of the pin results in movement of said member longitudinally of said recess, an abutment member secured in said recess between said screw-threaded member and spaced from the latter toward the top of said recess, said abutment member having an opening therethrough for the insertion of the pin of the ornament, and a spring bearing on said abutment member and on said screw-threaded member for resiliently urging the latter toward the bottom of said recess and thereby holding the ornament in position on said base, with said lower face confronting said upper face, the opening in said abutment member being larger than the diameter of said pin and the peripheral wall of said recess being spaced from the outer peripheral surface of said screw-threaded member whereby the pin of the ornament may be tilted in relation to the axis of said recess against the force of said spring by a force applied to said ornament, said means providing for said internally screw-threaded member being movable in said recess longitudinally thereof while held against rotation being constituted by said recess and said internally screw-threaded member being structurally complementary and non-circular.

WALTER F. MARTIN.
ROLLAND G. HALL.

References Cited in the file of this patent

UNITED STATES PATENTS

| Number | Name | Date |
|---|---|---|
| 508,319 | Iverson | Nov. 7, 1893 |
| 568,083 | Davidson | Sept. 22, 1896 |
| 606,541 | Grotenhuis et al. | June 28, 1898 |
| 846,503 | Palmer | Mar. 12, 1907 |
| 1,199,684 | Forbes | Sept. 26, 1916 |
| 2,041,382 | Strong | May 19, 1936 |
| 2,291,975 | Minero | Aug. 4, 1942 |